US007549447B1

(12) United States Patent
Garbo

(10) Patent No.: US 7,549,447 B1

(45) Date of Patent: Jun. 23, 2009

(54) PRESSURE VALVE INLET COVER SYSTEM

(76) Inventor: Joe Garbo, 4409 Spruce St., Bellaire, TX (US) 77401

( * ) Notice: Subject to any disclaimer, the term of this patent is extended or adjusted under 35 U.S.C. 154(b) by 0 days.

(21) Appl. No.: 11/998,535

(22) Filed: Dec. 1, 2007

(51) Int. Cl.
*F16L 55/10* (2006.01)

(52) U.S. Cl. ......................... 138/89; 138/90; 138/96 R; 215/262; 220/203.09; 220/203.29; 220/231; 251/354

(58) Field of Classification Search ............... 138/96 R, 138/96 T, 89, 90; 215/262; 220/203.04, 220/203.07, 203.09, 203.29, 231; 251/354
See application file for complete search history.

(56) References Cited

U.S. PATENT DOCUMENTS

| | | | | |
|---|---|---|---|---|
| 2,591,562 | A * | 4/1952 | Levell | 220/231 |
| 3,294,118 | A * | 12/1966 | Wieden et al. | 137/588 |
| 3,415,410 | A * | 12/1968 | Franchini | 220/203.29 |
| 4,097,937 | A | 7/1978 | Hofmann | |
| 4,203,473 | A | 5/1980 | Roberson, Sr. | |
| 4,429,719 | A * | 2/1984 | Mosing | 138/96 T |
| 4,466,550 | A * | 8/1984 | Sullivan | 220/203.07 |
| 4,736,863 | A * | 4/1988 | Harris | 220/203.21 |
| 4,820,474 | A * | 4/1989 | Leslie et al. | 376/203 |
| 5,373,869 | A | 12/1994 | Zdrok | |
| 5,915,418 | A * | 6/1999 | Turner | 138/89 |
| 6,035,455 | A | 3/2000 | Rankovic | |
| 6,116,286 | A | 9/2000 | Hooper et al. | |
| 6,312,890 | B1 | 11/2001 | Linehan et al. | |
| 6,351,985 | B1 * | 3/2002 | Bedwell | 73/49.8 |
| 6,375,024 | B1 * | 4/2002 | Park | 215/262 |
| 6,408,887 | B2 * | 6/2002 | Rahimzadeh et al. | 138/96 R |
| 6,769,291 | B1 | 8/2004 | Julian et al. | |
| 6,880,733 | B2 * | 4/2005 | Park | 222/397 |
| 6,887,373 | B2 | 5/2005 | McCoy | |
| 7,013,926 | B1 | 3/2006 | Storey et al. | |
| 2005/0189027 | A1 * | 9/2005 | Markham | 138/90 |

* cited by examiner

*Primary Examiner*—Patrick F Brinson

(57) ABSTRACT

A pressure cap having a generally cylindrical hollow body with a semispherical cap having an orifice defined within and passing through said cap, a valve stem passing through and of smaller cross-section than the orifice, a valve member supported by the valve stem within the hollow body, a valve seat surrounding the inner end of the orifice and upon which the valve member is normally seated so as to close the orifice, and mateable threading to attach to an existing pipe, or attach by frictional fit. It may also have a rubberized flange to fit over a drain line for pressuring a drain and any of a variety of valve stem configurations to accommodate different pump systems and access requirements. Further, a method for clearing an obstructed pipe using a pressure cap as disclosed. In another embodiment a balloon is positioned within the pipe to receive pressurized air until bursting, thereby sending a blast of air down the pipe to clear obstructions.

10 Claims, 3 Drawing Sheets

PRESSURE VALVE INLET COVER SYSTEM

CROSS REFERENCE TO RELATED APPLICATIONS

Not applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of plumbing and more specifically to pressure valve inlet cover system.

Plumbing lines may be clogged or blocked for any number of reasons. In certain situations it is advantageous to clear the line before performing work on the system. In prior art, plumbers have used various pumps and air pressurizers to clear the line, but did not have access to a fitted cap with inlet valve according to the present invention. In certain cases, the plumber would cup his hand over a line and insert a bike pump through an opening formed by his thumb and forefinger and attempt to create an airtight seal through which the pump would blow air. The pressurized air would if of sufficient pressure, push the water or other obstruction through the line, clearing the line for further work. This system has several disadvantages among which are the lack of tightness to the seal and general inefficiency in the process. Other systems that apply air pressure on lines are generally to seal off the line to check for leaks and are not suitable for the purpose of clearing the line in a simple and efficient manner.

BRIEF SUMMARY OF THE INVENTION

The primary advantage of the invention is to provide a fitted cap and valve for pressuring and clearing a blocked line.

Another advantage of the invention is to provide an improved connector that fits frictionally or by threading on existing plumbing fixtures without the need for additional plumbing.

Another advantage of the invention is to provide a cap that is easily manufactured.

Another advantage of the invention is to provide a cap that is self sealing.

A further advantage of the invention is to provide a cap that can be placed over a drain line and create a pressurizable seal.

In accordance with a preferred embodiment of the invention, there is shown a pressure cap having a generally cylindrical hollow body with a semispherical cap having an orifice defined within and passing through said cap, a valve stem passing through and of smaller cross-section than the orifice, a valve member supported by the valve stem within the hollow body, a valve seat surrounding the inner end of the orifice and upon which the valve member is normally seated so as to close the orifice, and threading on the inside diameter of said cylindrical hollow body for reciprocal engagement to a pipe.

In accordance with a preferred embodiment of the invention, there is shown a method for clearing a clogged pipe having the steps of affixation of a generally cylindrical hollow body with a semispherical cap having an air transmittable valve to the opening of a pipe, engaging the valve with a portable pump, activating the pump and imparting pressurized air into the valve and through the hollow body to remove an obstruction, and repeating the activation until the obstruction is removed.

In accordance with a preferred embodiment of the invention, there is shown a pressure cap having a generally cylindrical hollow body with a semispherical cap having an orifice defined within and passing through the cap, a valve stem passing through and of smaller cross-section than the orifice, a valve member supported by the valve stem within the hollow body, a valve seat surrounding the inner end of the orifice and upon which the valve member is normally seated so as to close the orifice, and an extended flange connected to the cylindrical body opposite the cap having a rubberized sleeve around the flange.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the issued claims and as a representative basis for teaching one skilled in the art to employ the present invention in virtually any appropriately detailed system, structure or manner.

Figure 1:
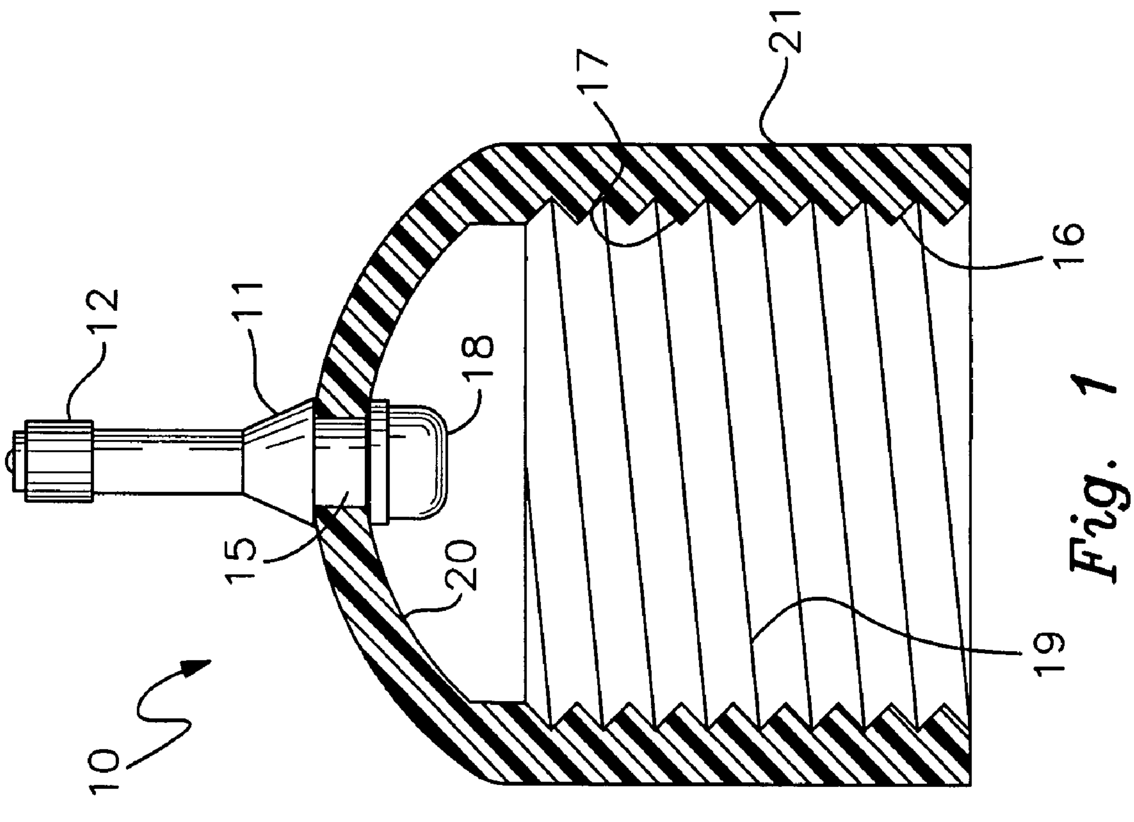
FIG. 1 is a partial cross sectional view of a cap with full view of a valve according to a preferred embodiment of the invention.

FIG. 1 shows a pressure cap 10 having a body 14 with an inner surface 20. Disposed through an aperture 15 in body 14 is a valve 12 having an upper portion 11 and lower portion 18 which portions are integrally formed as part of valve 12. Valve 12 is seated on the top of body 14 and frictionally connected to lower portion 18. As will be more fully described below, the air pressure present in the system causes upper and lower portions of valve 12 to create a airtight seal between the outside of cap 12 and the inner cavity 19. Body 14 is shown with internal threading 17 that may mate with an externally threaded pipe or other cylindrical member for a tight fit. In other preferred embodiments, internal threading may be omitted and a smooth surface maintained within body 14 for a frictional fit to another pipe having an external diameter substantially equal to the inner diameter of elongated portion 21 of body 14.

In a preferred usage, pressure cap 10 facilitates the clearing of a blocked plumbing line or other conveyance tube. An access point is obtained for the blocked pipe such as a cleanout or the placement of a T-shaped pipe in the line or other conventional means. The pressure cap of the present invention is placed in the access point, either by threadable mating attachment, frictional mating of equally sized pipe or by sealable engagement as more fully described with respect to FIGS. 5 and 6. Under either configuration, a tight fit is obtained between the pressure cap 10 and the subject line. Valve 12 is thus accessible to the user and is pressurized with a pump, which may be in a preferred embodiment a standard bike pump that fits the valve. Valve 12 may be of any of a variety of configurations, including but not limited to Shrader valves, Presta valves and any other attachment that permits the ingress of air under a pressurized condition. In other embodiments, the ingress point may be a fitting that mates with any air pressurization means so long as the air pump or air pressurization means can build the desired amount of air pressure to force air down through the cap and onto the subject line.

Once pressure cap 10 is properly engaged, and pressure is applied to the valve, air is forced down the space formed by the walls of cap 14, thereby sealing upper and lower portions 11 and 18 and sending air outward from lower portion 18 into the longitudinal portion 21 and down the subject pipe. Once air pressure reaches a desired level, the water or other obstruction present in the line is pushed out and the line is cleared.

Figure 2:
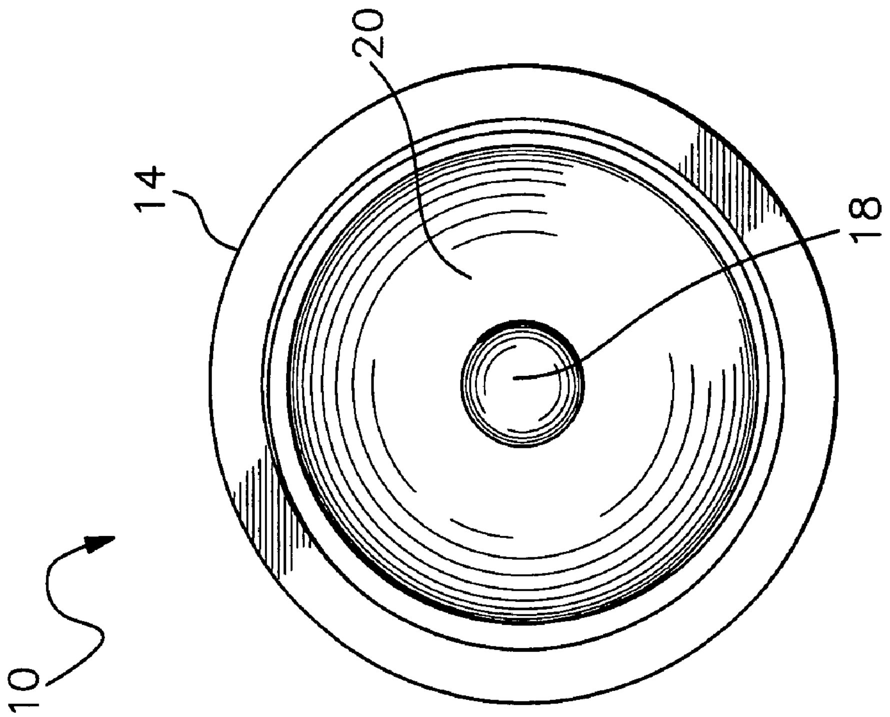
FIG. 2 is bottom plan view of the cap shown in FIG. 1 according to a preferred embodiment of the invention.

Pressure cap 10 can be made in any of a variety of diameters and styles to fit virtually any pipe or other conduit system. FIG. 2 shows a bottom plan view of pressure cap 10 having an inner surface 20 and lower portion 18. Inner surface 20 is shown in FIG. 1 having mating threading which may be of any variety to suit the applicable situation.

In another embodiment, the cap may be placed over the pipe after placement of a flexible balloon that rests inside the pipe and is fitted over the outer diameter of the pipe by rolling the upper portion of the balloon over the top of the pipe opening. After placement of the balloon, the cap is fitted and pressurized as before. The position of the cap seals the balloon so that only air pressure through the valve in the cap enters the balloon. As the pressure builds, it inflates the balloon which holds the air pressure to a point at which it bursts, sending a rush of air down the pipe facilitating the clearance of the pipe.

In another embodiment, the cap can be applied to a line that contains is trapped gases such as flammable gas within a pipe. By applying air pressure to the line via cap 10, the line can be cleared or blown clear of any gasses. This could be used with a long pipe that has many bends or on long pipes that do not receive adequate ventilation.

Figure 4:
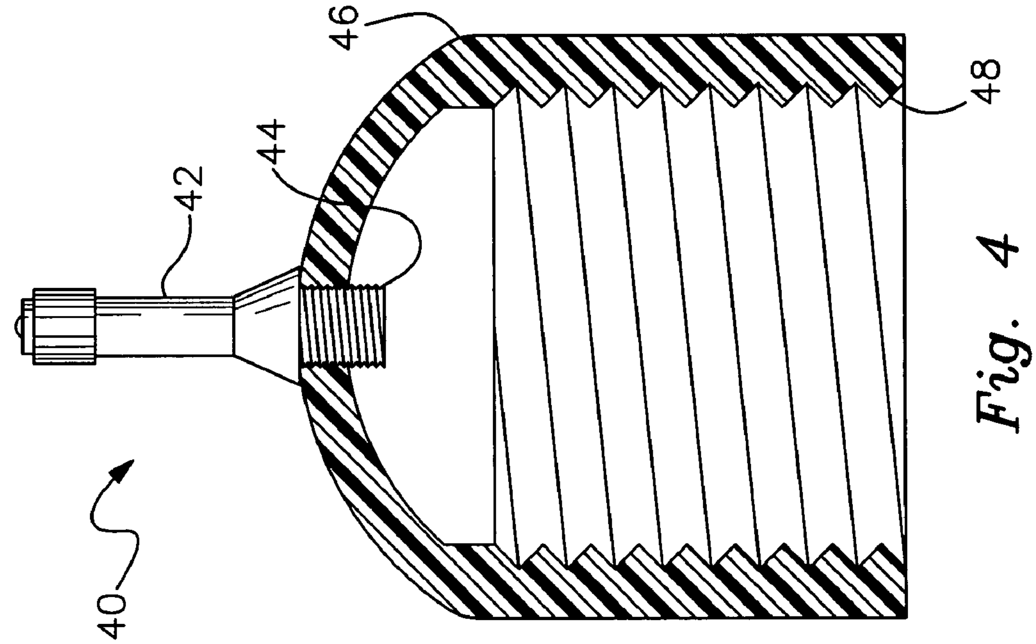
FIG. 4 is a partial cross sectional view of an internally threaded cap with a threaded inserted valve shown in full view.
Figure 3:
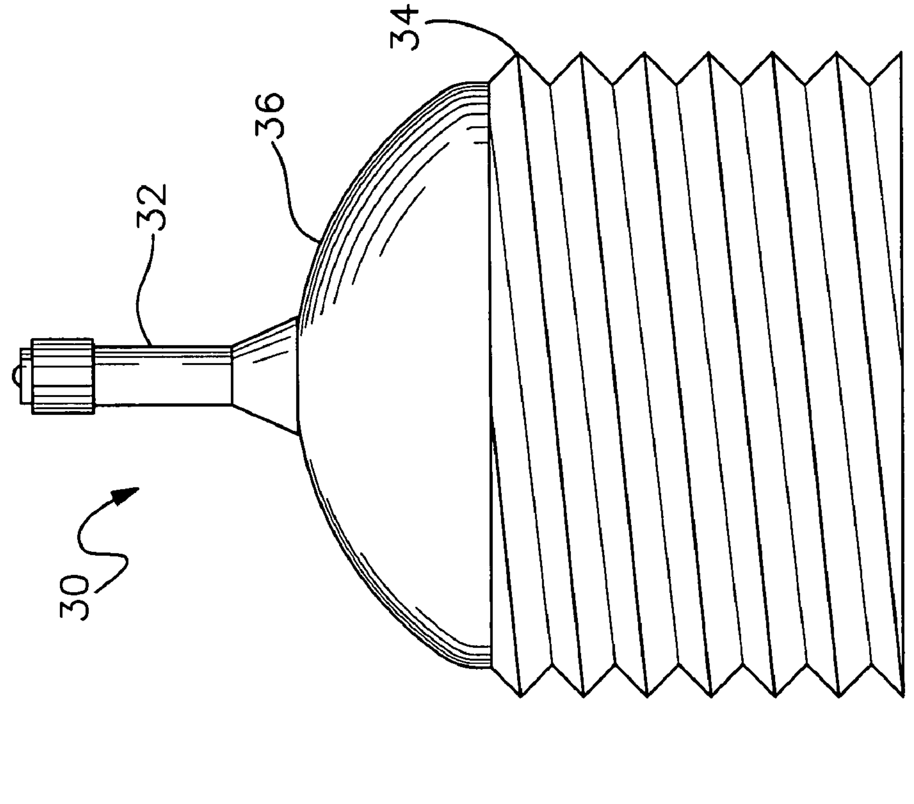
FIG. 3 is a partial cross sectional view of a threaded cap with cap and valve shown in full view.

FIG. 3 shows pressure cap 30 having valve 32 inserted into cap 36. Pressure cap 30 is shown with external threading 34 which may be of any variety of sizes to accommodate a female threaded pipe fitting. Once pressure cap 30 is fixedly attached to the line, pressure is introduced through valve 32 into the line to remove blockage downstream from the pressure cap. FIG. 4 shows a cross sectional view of a pressure cap 40 having a valve 42 that is threadably attached to the cap 46. Valve 42 is screwed into cap 46 and is firmly attached so that when pressurized the valve is stable and transmits air pressure down the line of the subject pipe. Cap 40 is shown with internal threading for mating to a male threaded pipe or other longitudinal member, but may be externally threaded as shown in FIG. 3 or frictionally attachable without threading as is common with PVC piping in common use.

Figure 5:
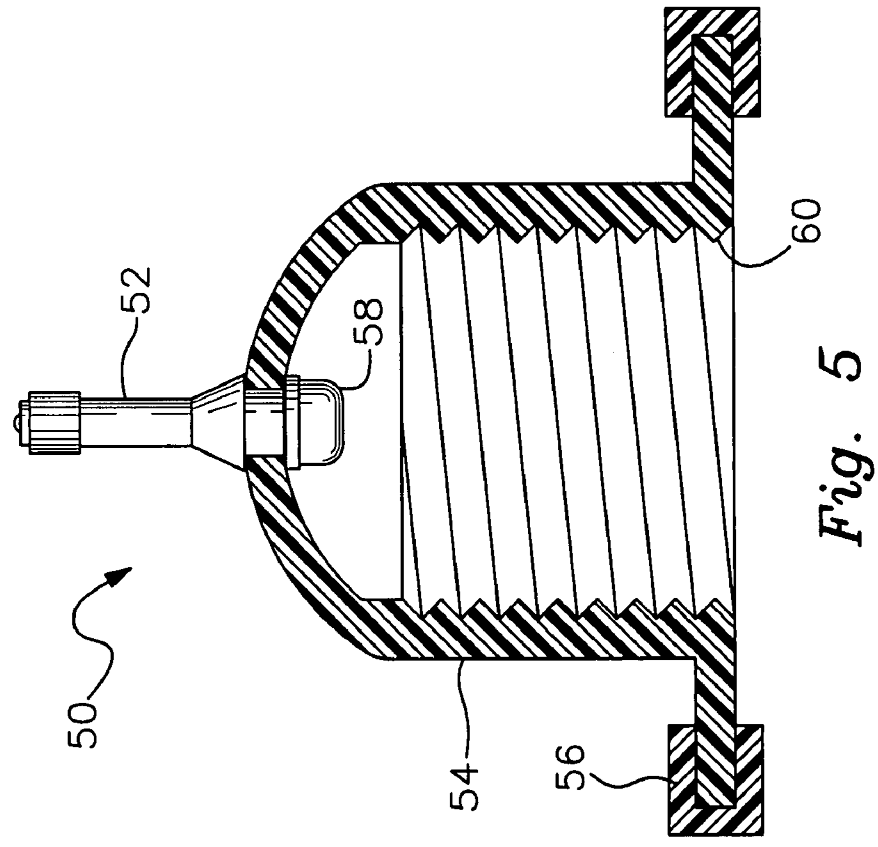
FIG. 5 is a partial cross sectional view of an internally threaded cap with flange and rubber seal with valve shown in full view.

In any of the foregoing embodiments, the valve may be of a longitudinal length so as to be accessible even if the cap is placed in an environment where the cap head is under water. In this way, even if the cap is placed on the subject line and is surrounded by water, the valve may protrude upward to such an extent as to be above the water. FIG. 5 shows a pressure cap 50 for use on an open drain line that does not have a threaded or frictionally accessible fitting. Pressure cap 50 has a flange 60 that protrudes outward and is preferably covered with a circumferential rubber grommet 56 to increase the sealing power of the pressure cap when placed over the drain or sink cover. With sufficient force applied by the user, pressure cap 50 is placed over an opening, which in many cases will be a drain, and then pressurized air is introduced through valve 52 and out lower portion 58 into the cap and down the subject line. Although pressure cap 50 is shown with internal threading which in certain circumstances may be desirable, it will perform equally as well no threading in the case of a drain since the sealable fit is achieved by the placement of rubber grommet 56 about the periphery of the drain. Pressure cap 50 may be made of any of a variety of sizes and configurations sufficient to create a seal about the opening or drain and provide adequate pressurization to apply air pressure through the valve. It may also be applied to the drain line in a toilet by covering the opening and applying pressure.

Figure 6:
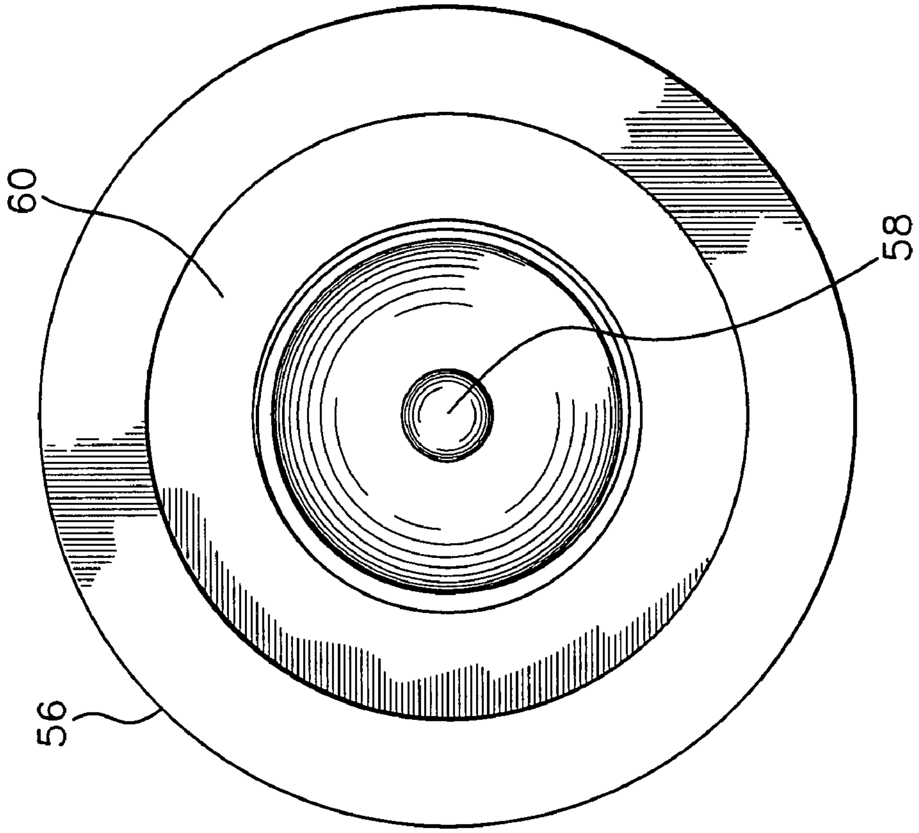
FIG. 6 is a bottom plan view of the cap shown in FIG. 5.

FIG. 6 shows a bottom plan view of pressure cap 50 having outer grommet 56 about flange 60 with the bottom portion 58 of valve 52 being adhered through air pressure with bottom portion 58 integrally formed with valve 52. As previously noted, the valve can also be affixed with threading or more permanently with adhesives or glue. Further, the valve stem may be extended to reach through standing water in the drain or may be attached to a flexible hose fitting to further extend the valve out of water or other obstruction. In this embodiment, the cap is sealed about the drain by physical pressure applied by the operator or other force whether it be a weight, clamps or other means to engage the rubber seat about the drain or opening. Once engaged, the user may then apply air pressure through the aforementioned means to pressurize the line and force the opening of the line whether it be blocked by standing water or other physical obstruction.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the claims.

I claim:

1. A pressure cap comprising:

a. a generally cylindrical hollow body having an inner cavity with a cap having an orifice defined within and passing through said cap for sealable engagement of a valve;

b. the valve including a valve stem passing through and of smaller cross-section than the orifice;

c. Upper and lower pressure sealable valve members integrally formed with said valve stem and supported by the valve stem;

wherein said valve stem is normally seated on the cap so as to close the orifice when said upper and lower members are positioned on opposite sides of the orifice and create an air tight seal between outside the cap and the inner cavity upon application of air pressure on the lower valve member.

2. The pressure cap as claimed in claim 1 wherein said valve is a Schrader valve.

3. The pressure cap as claimed in claim 1 wherein said valve is permanently affixed in said orifice.

4. The pressure cap as claimed in claim 1 further comprising threading on the inside diameter of said cylindrical hollow body for reciprocal engagement to a pipe.

5. A pressure cap comprising:

a. a generally cylindrical hollow body having an inner cavity with a cap having an orifice defined within and passing through said cap for sealable engagement of a valve;

b. the valve including a valve stem passing through and of smaller cross-section than said orifice;

c. Upper and lower pressure sealable valve members integrally formed with said valve stem and supported by the valve stem;

wherein said valve stem is normally seated on the cap so as to close the orifice when said upper and lower members are positioned on opposite sides of create an air tight seal between outside the cap and the inner cavity upon application of air pressure on the lower valve member; and e. An extended flange connected to said cylindrical body opposite said cap having a rubberized sleeve around said flange.

6. A pressure cap as claimed in claim 5 further comprising an elongated tube connecting said valve seat and said valve stem.

7. A pressure cap as claimed in claim 5 wherein said valve is threadably connected to said cap.

8. A pressure cap as claimed in claim 5 wherein said valve is fixedly attached to said cap.

9. A pressure cap as claimed in claim 5 wherein said body engages a pipe by frictional engagement between the inner diameter of said body and the outer diameter of said pipe.

10. A pressure cap as claimed in claim 1 wherein said body engages a pipe by frictional engagement between the inner diameter of said body and the outer diameter of said pipe.

* * * * *